(12) United States Patent
Warrier

(10) Patent No.: US 10,198,537 B2
(45) Date of Patent: Feb. 5, 2019

(54) METHOD AND SYSTEM FOR IMPLEMENTING INTELLIGENT SYSTEM DIAGRAMS

(71) Applicant: ORACLE INTERNATIONAL CORPORATION, Redwood Shores, CA (US)

(72) Inventor: Roshen Warrier, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 807 days.

(21) Appl. No.: 14/586,474

(22) Filed: Dec. 30, 2014

(65) Prior Publication Data

US 2016/0188762 A1 Jun. 30, 2016

(51) Int. Cl.
| | | |
|---|---|---|
| *G06F 17/50* | (2006.01) | |
| *G06F 21/10* | (2013.01) | |
| *H04L 29/08* | (2006.01) | |
| *G06Q 99/00* | (2006.01) | |

(52) U.S. Cl.
CPC ........ *G06F 17/5009* (2013.01); *G06F 21/105* (2013.01); *G06Q 99/00* (2013.01); *H04L 67/02* (2013.01); *G06F 2217/74* (2013.01)

(58) Field of Classification Search
CPC ............... G06F 21/105; G06F 17/5009; G06F 2217/74; G06F 8/34; G06Q 99/00; H04L 67/02
See application file for complete search history.

(56) References Cited

U.S. PATENT DOCUMENTS

| | | | |
|---|---|---|---|
| 7,975,233 B2 * | 7/2011 | Macklem | G06F 8/34 715/234 |
| 2003/0034998 A1 * | 2/2003 | Kodosky | G05B 19/0426 715/736 |
| 2004/0158495 A1 * | 8/2004 | Gennaro | G06Q 10/10 705/23 |
| 2011/0087601 A1 * | 4/2011 | Apte | G06F 21/105 705/52 |
| 2011/0173597 A1 * | 7/2011 | Cascaval | G06F 9/44505 717/148 |
| 2014/0282619 A1 * | 9/2014 | Michie | H04L 67/02 719/318 |
| 2016/0063419 A1 * | 3/2016 | Martinez | G06Q 10/06315 705/7.25 |

\* cited by examiner

*Primary Examiner* — Jacob D Dascomb
(74) *Attorney, Agent, or Firm* — Vista IP Law Group, LLP

(57) ABSTRACT

Disclosed is a system, method, and computer program product for an improved approach to implement system diagrams. Diagrams are implemented having intelligent icons, where the icons correspond to objects that have metadata about the actual product being represented by the intelligent icon.

37 Claims, 14 Drawing Sheets

| TO \ FROM | App 1 | App2 | DB 1 | DB 2 |
|---|---|---|---|---|
| App 1 | Yes | No | Yes | No |
| App 2 | No | Yes | Yes | Yes |
| DB 1 | Yes | Yes | Yes | No |
| DB 2 | No | Yes | No | Yes |

METHOD AND SYSTEM FOR IMPLEMENTING INTELLIGENT SYSTEM DIAGRAMS

BACKGROUND AND SUMMARY

A drawing tool is an application that can be used to create diagrams and pictures. Visio and OmniGraffle are examples of commercially available drawing tools that include functionality to insert pictures and icons into a drawing frame. This functionality is useful in many business settings to create diagrams of computing architectures and environments, where the icons inserted into the picture to represent different applications, components, and/or hardware objects in the environment.

There are many uses for this type of diagram, where the diagram captures and records different items either currently or planned to be included in the computing environment. For example, with respect to enterprise IT (Information Technology) sales consulting, visually capturing information about customer IT environments is very important to the sales process, since it can assist to identify the type, quantity, and configuration of products that can be usefully marketed to the customer.

Embodiments of the present invention provide an improved approach to implement system diagrams. Instead of a diagram that only contains "dumb" icons, the embodiments of the invention provide for diagrams having intelligent icons, where the icons correspond to objects that have metadata about the actual product being represented by the intelligent icon.

Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIG. 2B illustrates an example compatibility matrix.

DETAILED DESCRIPTION

Embodiments of the present invention provide an improved approach to implement system diagrams. Instead of a diagram that only contains dumb icons, the embodiments of the invention provide for diagrams having intelligent icons, where the icons correspond to objects that have metadata about the actual product being represented by the intelligent icon.

Figure 1A:
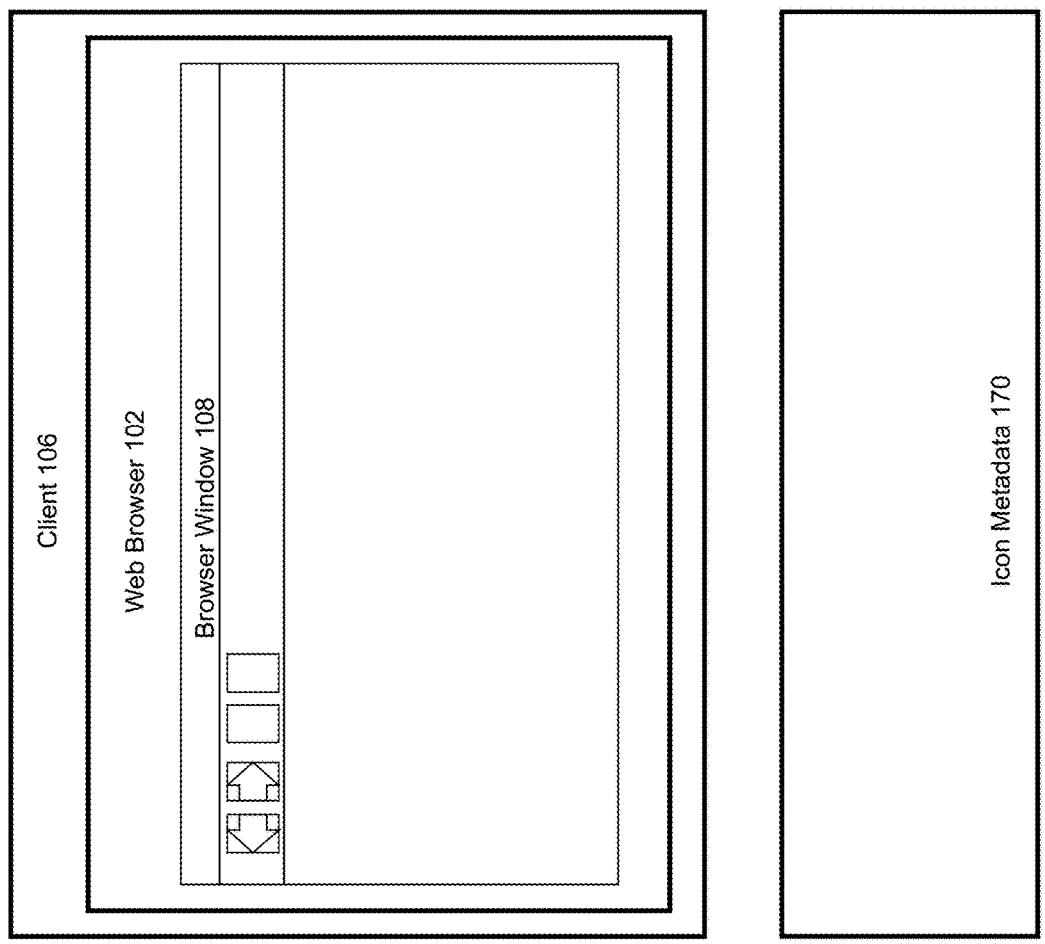
FIGS. 1A-E illustrate an embodiment of the invention to maintain metadata for product icons on a diagram.
Figure 1A:
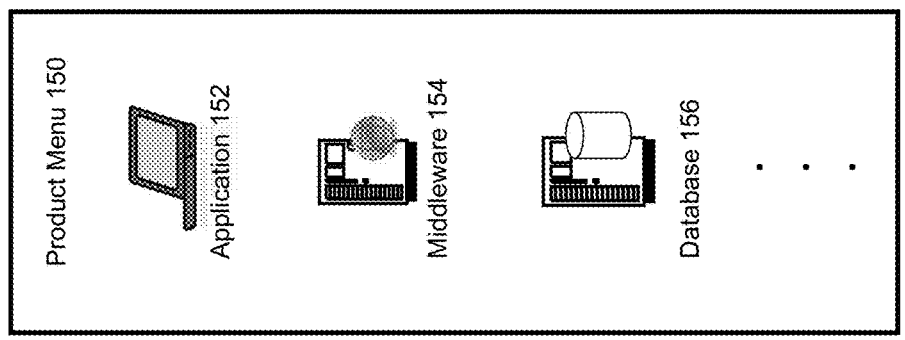

As shown in FIG. 1A, some embodiments provide a library (also referred to herein as a "palette") of enterprise IT products in a user interface menu 150 (e.g., database 156, application/middleware server 154, applications 152). To illustrate an IT configuration, some or all of the products represented in menu 150 are selectable to be dragged onto a canvas in a browser window 108. In some embodiments, a searchable product library containing enterprise software and hardware products is represented as objects that can be dragged into a studio and connected to build architectures. When a product object is deployed in the studio, an instance representing the corresponding product/connector is created for that product project, and information can be added/configured for that product.

Figure 1B:
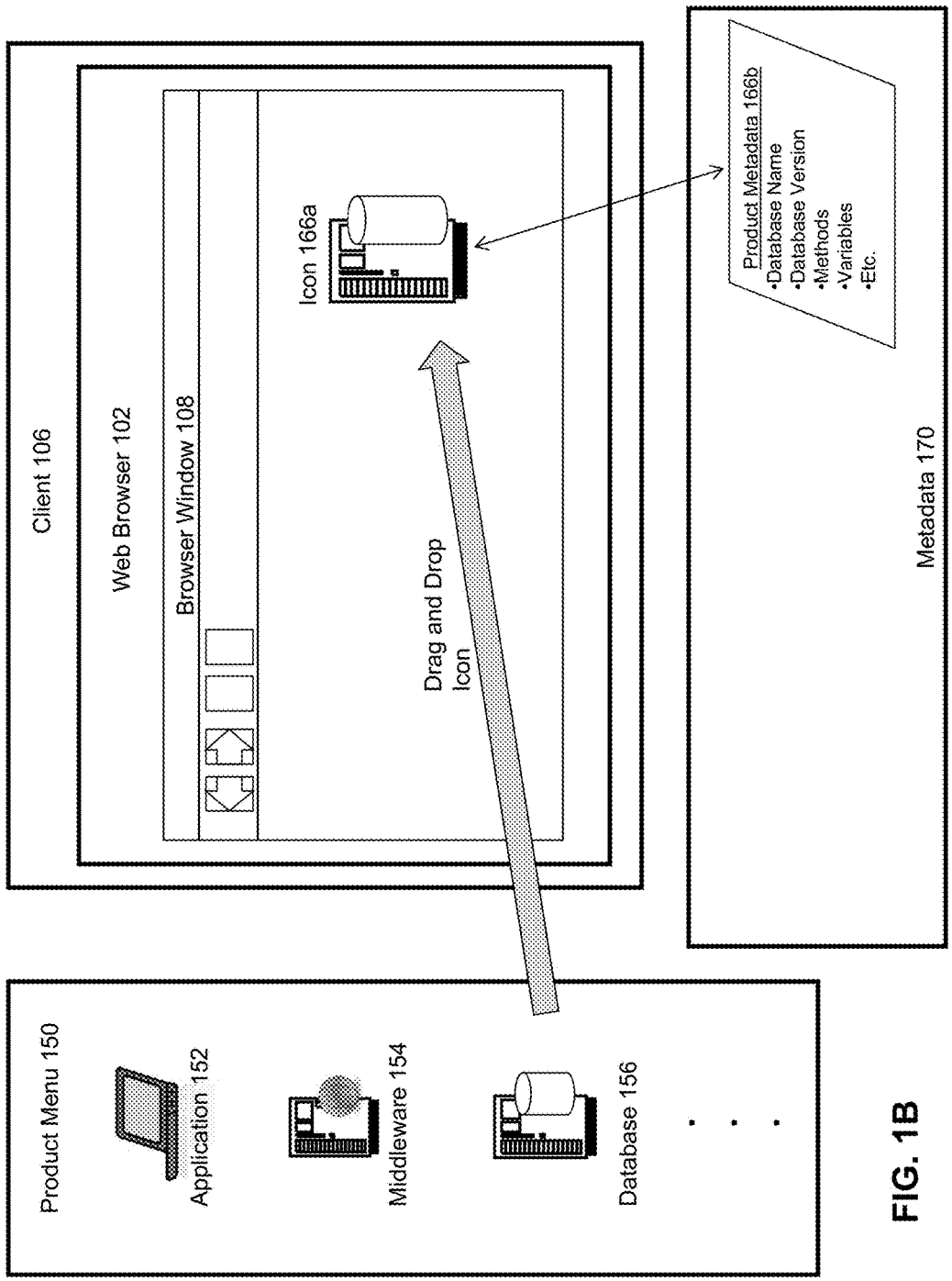

For example, as shown in FIG. 1B, the icon 166a for a specific database product 156 can be dragged onto the user interface in the browser window 108. This results in an instance of that product object being created at the client for the diagram represented on the interface canvas. Unlike dumb icons, the intelligent icons of the present invention are associated with metadata having product-related content for the object. For example, for the icon 166a for a database product, the corresponding metadata 166b for that icon may include information such as a database name, version number, methods, variables, whether or not the database is in a cluster, hardware attributes, etc. The information in the metadata may be configured by the user when inserting or editing the object instance. Alternatively, some or all of the information may be automatically populated by the system.

Figure 1C:
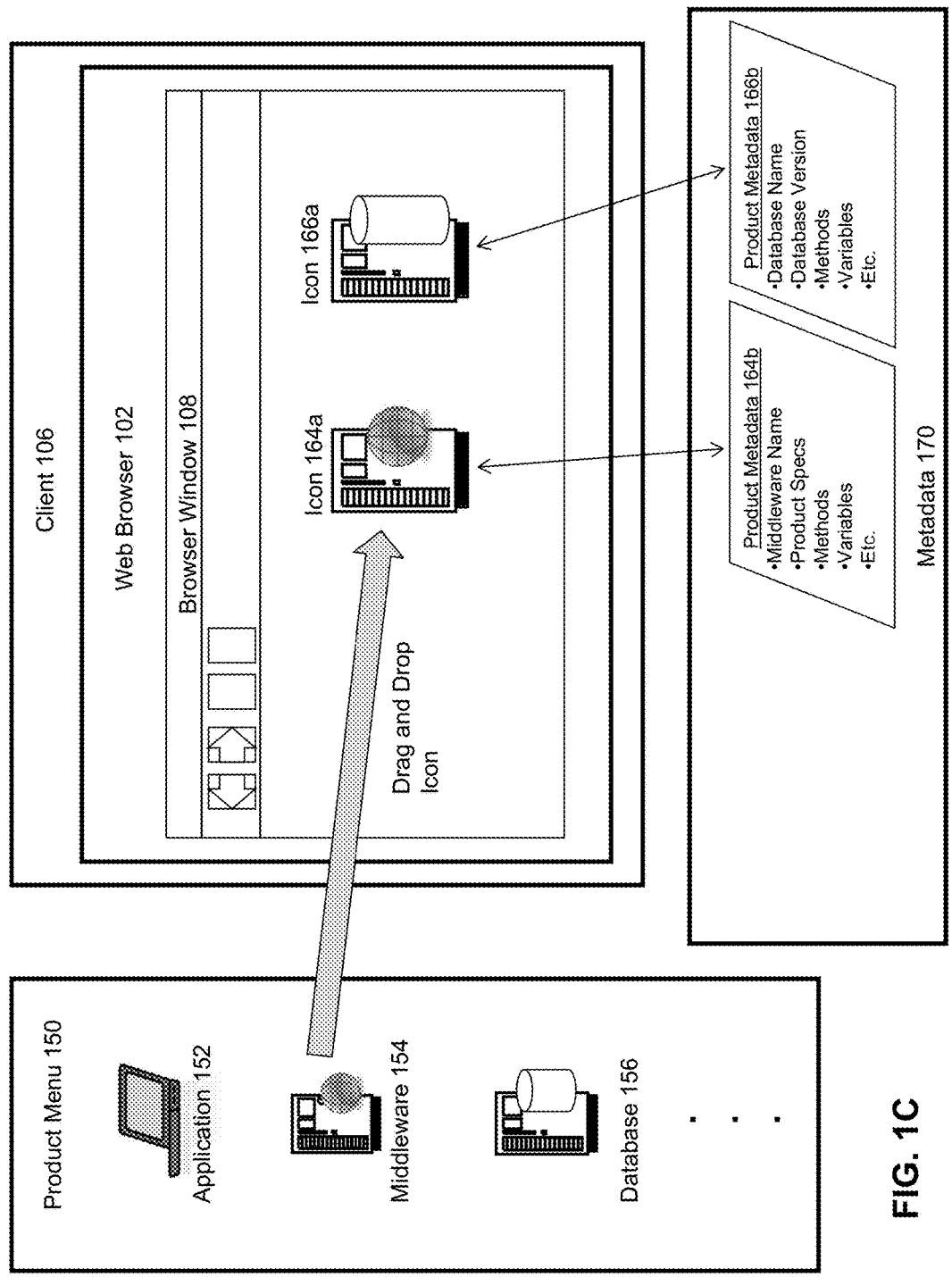
Figure 1D:
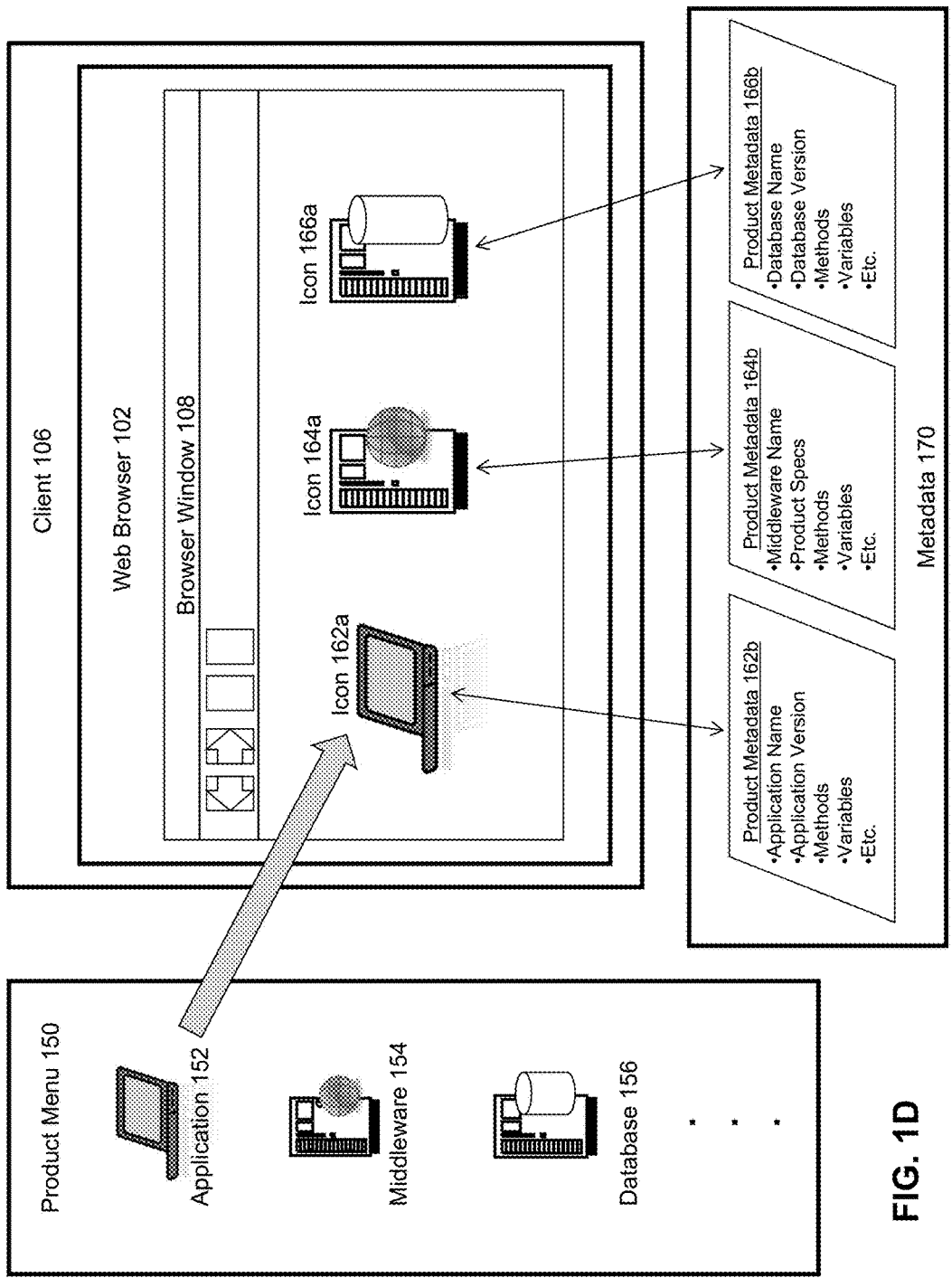

In a similar way, as shown in FIG. 1C, the icon 164a for a middleware/application server product 154 can be dragged onto the user interface in the browser window 108 to include the middleware/application server product 154 into the IT diagram. An instance of that middleware/application server product 154 is then created and associated within the frame at that location. Metadata 164b having product-related content for the icon 164a is then created. Likewise, as shown in FIG. 1D, the icon 162a for an application 152 can be dragged onto the user interface in the browser window 108 to insert an application into the IT diagram. Metadata 162b having product-related content for the icon 162a is then created.

Figure 1E:
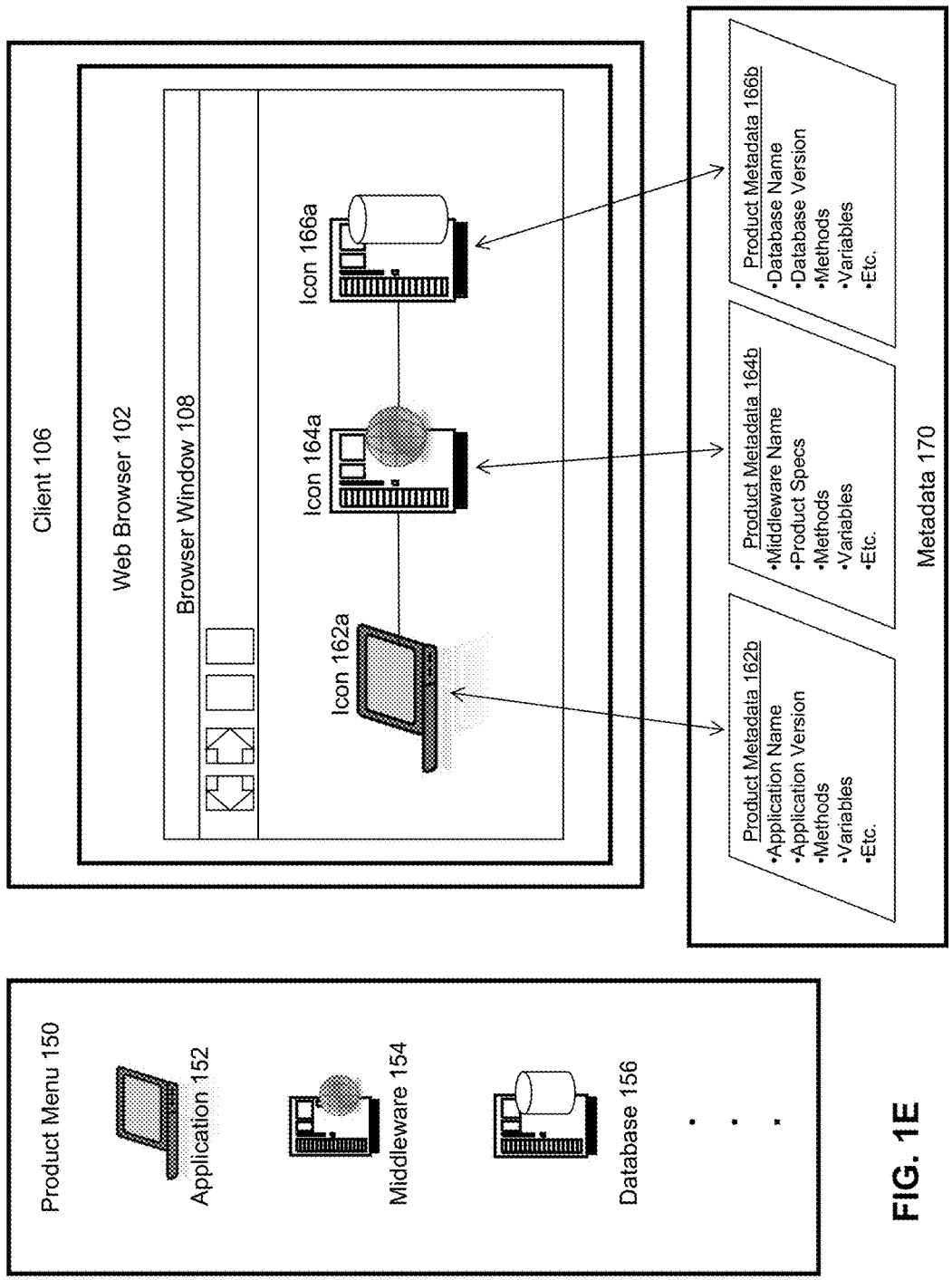

As shown in FIG. 1E, connections can be made between each of the icons to configure the interconnections between the different IT systems components. Connection mechanisms are provided to connect the components in the diagram to replicate actual connections between components in an IT environment. In some embodiments, auto-connection is provided, whereby two objects likely to be connected are automatically connected upon deployment in the studio. If the user indicates otherwise, then the auto-connection can be reversed. Connection metadata (not shown in figure) is created to correspond to the connection mechanisms represented in the canvas, and stored within metadata 170, including connection identifiers, properties, methods, and/or variables.

The product and connector icons are represented as objects whose methods simulate the functionalities of the real-life components that they represent. This allows the system to perform graphical and user-interactive simulations involving, for example, customized data, events (e.g., power outage addressed by clustering/failover, usage spike addressed by load balancing), and IT actions (e.g., caching, ETL (Extract-Transform-Load))).

There are many advantages provided by the embodiments of the invention. For example, this approach allows sales consultants to easily create precise web diagrams depicting IT architectures. With respect to the products, this approach is vastly more sophisticated than ordinary diagram/drawing editors because it contains metadata regarding product information. This allows various functions on top of basic diagram editing, including, for example, checking and verifying the configuration represented by the diagram.

Figure 2A:
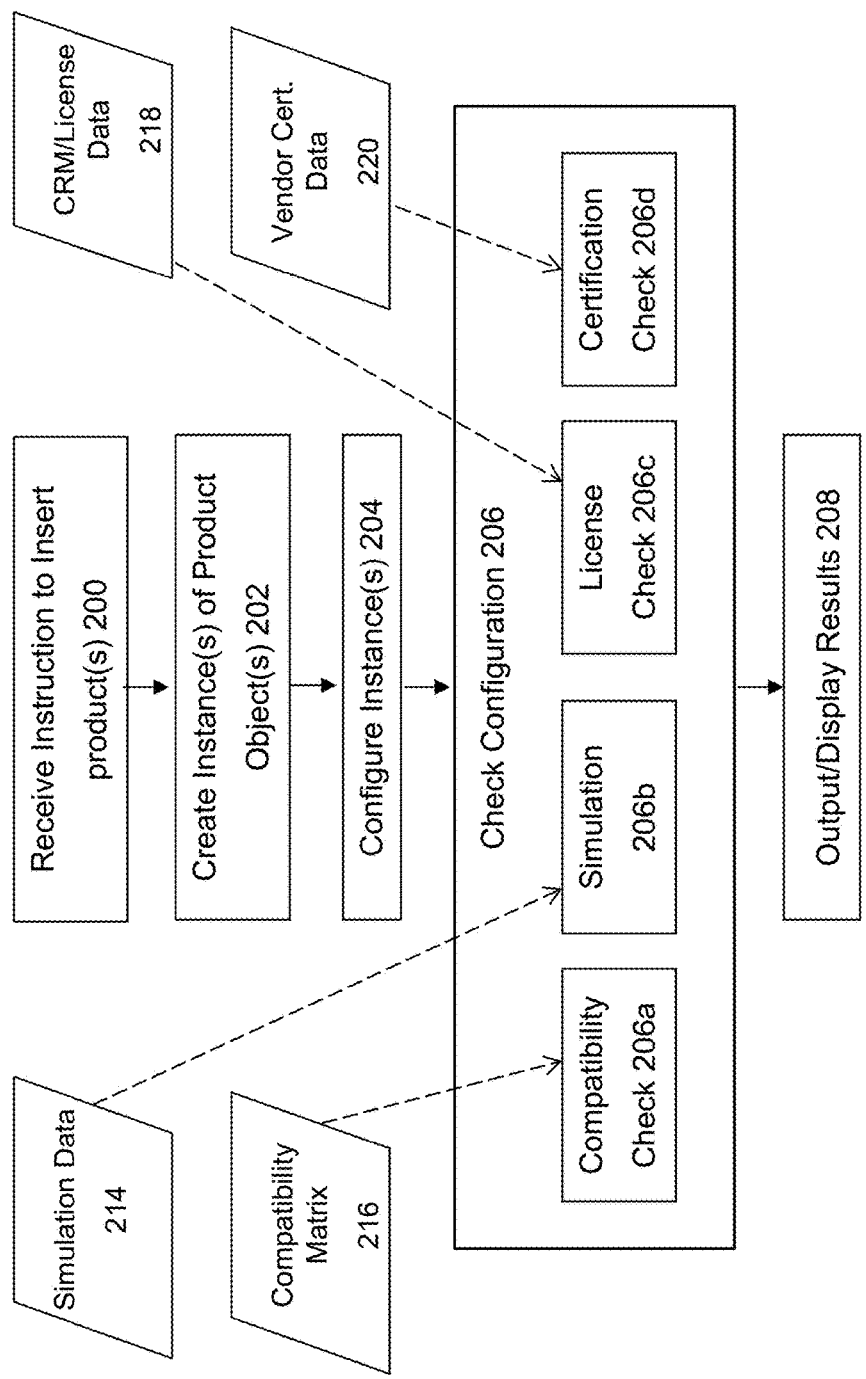
FIG. 2A shows a flowchart of an approach for implementing some embodiments of the invention.

FIG. 2A shows a flowchart of an approach for implementing some embodiments of the invention. At 200, an instruction is received to insert one or more products onto the diagram. This may be accomplished, for example, by selecting icons corresponding to one or more products from a product menu, and dropping the icons onto a canvas in a user interface. The interface controller recognizes this action by the user as an instruction to insert the product into the diagram.

At 202, an instance of the product is created in correspondence to the insertion of the product icon into the diagram. The instance can then be configured at 204. As described in more detail below, some of the data for the product instance pertain to generic data from a library, while others pertain to specific information that is created for the new instance. Connection objects may also be added at this time.

At 206, the configuration represented by the diagram is checked. For example, one type of check 206a that can be performed is to verify whether the products in the diagram are functionally compatible. A compatibility matrix 216 can be provided to perform this type of compatibility check, e.g., as shown in FIG. 2B. The compatibility matrix 216 can include a set of rows and columns where products are represented along the left column (e.g., for "From" products) and the top row (e.g., for "To" products), and the corresponding entry for each combination of To-From products can be configured to indicate whether that product combination is compatible.

It should be noted that the inventive concepts disclosed herein provide for more detailed information that can be used in this type of matrix—beyond simply "Yes" and "No" information. For example, symbols can be used to indicate that two products can be configured to work together using custom code, rather than being incompatible outright.

As another example, a simulation 206b can be performed of the IT solutions, configuration, and/or concepts represented by the diagram. Simulation data 214 can be provided to check the functional interrelationships of the products in the diagram. The simulation data 214 may include custom data that is provided to the objects to perform the simulation. The frame may be configured as a dynamic frame in order to perform the simulation, where the dynamic nature of the frame allows for listening for events that are then processed to perform the simulation using the simulation data.

The type of simulation data 214 that is used as input data pertains to the type of objects being simulated and to the type of simulation that is being performed. For example, to simulate a database cluster, information is needed that identifies that the product belongs to that specific cluster. This information may be provided, for example, as part of the Specific Data 610 shown in FIG. 6, which is accessed by the Content Manager 608. Specific (state-related) information may be needed for the simulation that refers to a specific instance (e.g., an icon's location in the frame), and which may also be provided as part of the Specific Data and that is accessed by the Content Manager. Some types of generic information may be needed for the simulation, e.g., Product Name/ID, (as well as matrices for checks), which may be provided as part of the Generic Data 612 in FIG. 6, which is also accessed by the Content Manager 608. The Content Manager 608 is responsible for deciding from where the information is to be retrieved. Other client-side components may not need to be aware of the distinction between Generic and Specific data.

Yet another example check 206d is to determine whether systems are certified, e.g., qualified for support from the product vendors. This can be performed using information supplied by the product vendors in combination with the specific products and product combinations placed into the diagram. In some embodiments, the certification check involves verifying whether systems (e.g., products) in a given architecture qualify for support by vendors. Software vendors have stipulations whereby they only support products working on certain platforms or with certain other systems. This is a complicated check, as one must contend with complex architectures, as well as multiple vendors, each having its own support structure.

Another example check 206c pertains to checking whether products placed onto the diagram are properly licensed. One way to implement this check is to provide integration with a CRM (customer relationship management) system to obtain CRM/license data 218. Integration can be provided (e.g., using adapters/plug-ins) to licensing application(s) to, for example, check whether indicated systems are in compliance with vendor requirements and provide non-compliance alerts (for customers and/or vendors) on the basis of customers' product licensing.

Of course, it should be clear that this list of checks in 206 is not an exhaustive list and that other types of checking and verification may be performed within the scope of the invention. For example, yet another use scenario is to provide integration with pricing data/applications and TCO (total cost of ownership) calculators to, e.g., provide information about the annual cost of a current architecture versus the projected cost of a proposed one or compare the TCO among different vendors' products. The pricing check can be implemented to rely on a simple value lookup.

At 208, the analysis results may be output to storage and/or displayed to the user on the user interface. For example, when performing verification checks, one or more charts/dashboards can be displayed to visually present the results of the verification activities, e.g., using a graph or histogram to illustrate the results of a performed simulation of the configuration represented in the diagram.

Figure 3:
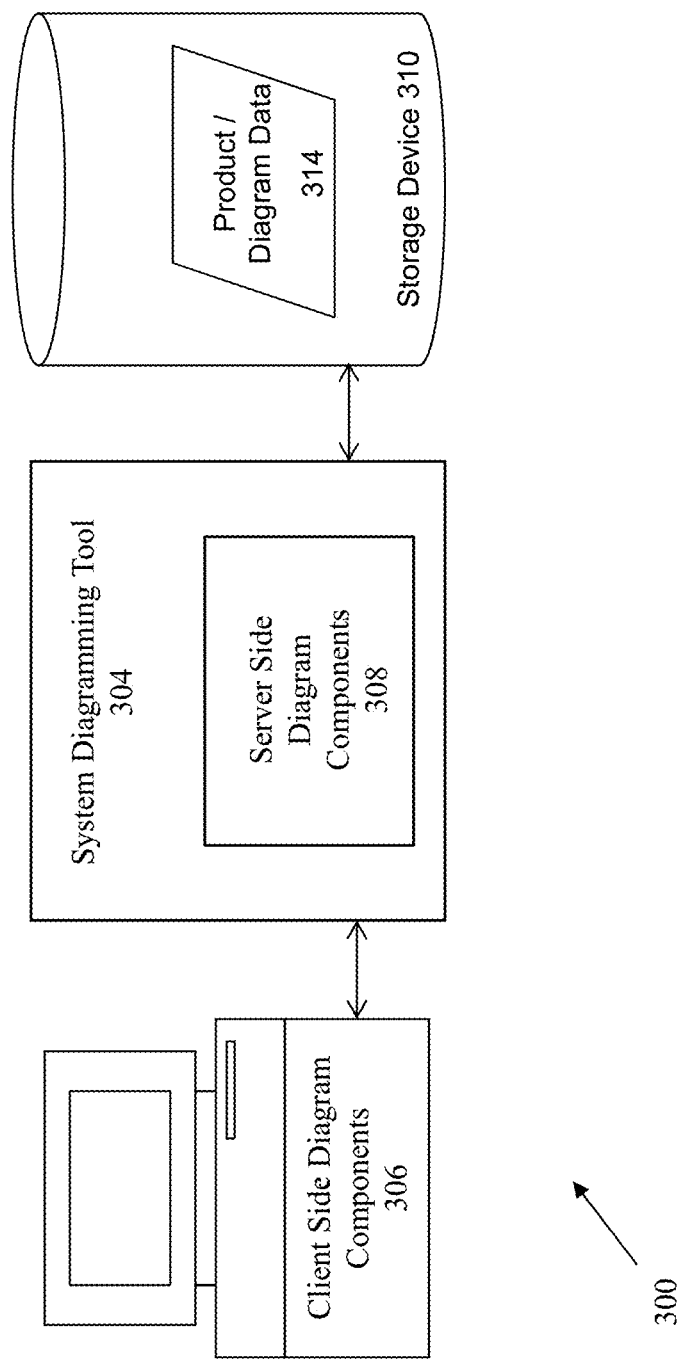
FIG. 3 illustrates an example system that may be employed in some embodiments of the invention.

FIG. 3 illustrates an example system 300 which can be employed in some embodiments of the invention to implement an intelligent diagram. The system 300 includes one or more users at one or more user stations that use the system 300 to operate and interact with the system diagramming tool 304. The user station comprises any type of computing station that may be used to operate or interface with the system diagramming tool 304 in the system 300. Examples of such user stations include, for example, workstations, personal computers, mobile devices, and remote computing terminals. The user station comprises a display device, such as a display monitor, for displaying a user interface to users at the user station. The user station also comprises one or more input devices providing the user with operational control over the activities of the system 300, such as a mouse or keyboard to manipulate a pointing object in a graphical user interface to generate user inputs.

The system diagramming tool 304 comprises functionality that is accessible to users at the user stations, e.g., where system diagramming tool 304 is implemented as a set of engines or modules for diagramming functionality. A set of client-side components 306 operate and provide functionality at the client device. A set of server-side components 308 are located at the server to interface with the product/diagram data 314 in a database, such as a database management system (DBMS) implemented with one or more storage devices 310.

The computer readable storage device 310 comprises any combination of hardware and software that allows for ready access to the data that is located at the computer readable storage device 310. For example, the computer readable storage device 310 could be implemented as computer memory operatively managed by an operating system. The data in the computer readable storage device 310 could also be implemented as database objects, cloud objects, and/or files in a file system.

As noted above, some embodiments of the invention are implemented in two parts: a server part and a client part.

Figure 4:
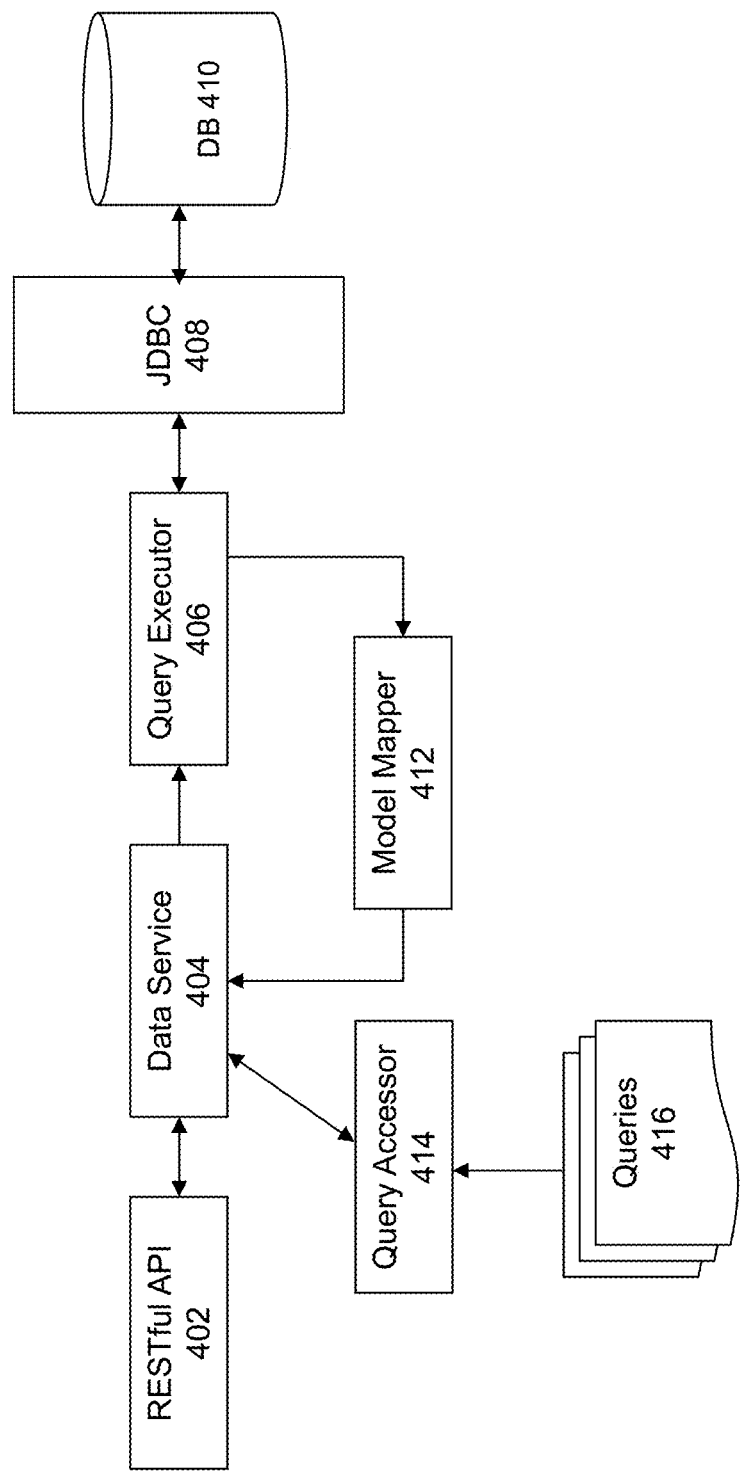
FIG. 4 illustrates an approach for implementing the server-side components according to some embodiments of the invention.

FIG. 4 illustrates an approach for implementing the server-side components according to some embodiments of the invention. The server side is executed in a Java application container, e.g., it runs in Jetty (an example of a Java based HTTP server/servlet container) and comprises a JAX-RS (Java API for RESTful Web Services) implementation. In some embodiments, the components maintain very few dependencies on third-party libraries.

The server-side components comprise an application programming interface (API) 402 to handle requests from the clients. In some embodiments, a RESTful API is provided to handle HTTP requests. The JAX-RS implementation maps the Java methods of the application class to the HTTP (The Hypertext Transfer Protocol) requests and their parameters and bodies. The web application uses Java servlet security to restrict unauthorized access. There are three example types of resources: resources available to any user (e.g., static HTML, CSS (Cascading Style Sheets), and other resources), resources available to normal (authenticated) users, and resources available to administrator (admin) users. The resource-to-role mapping is performed in a standard web.xml.

When a request comes from the client side, it is routed to a particular handler method of the application class. To access the data, the handler method calls the data service 404. The responsibility of the data service 404 is to retrieve data and to send new data to the data storage. For this, the data service needs to know which query to execute. In the current embodiment, queries are externalized to a separate properties file. Thus, to obtain a query, the data service uses a query accessor module 414. The query accessor module 414 is also used to select which properties file 416 to load, depending on the appropriate SQL dialect. This flexibility allows the application to run with any DB server. To support a new database, one would simply prepare queries specific to the SQL dialect of that new DB server, without needing to change the data service code.

To simplify the access to the data storage, a query executor module 406 is employed. The query executor module 406 is implemented as a query wrapper for methods in a data connectivity component 408, e.g., embodied as JDBC (Java Database Connectivity), where it wraps the JDBC API and maps the result data sets to appropriate data models. The queries are sent for execution to the database 410, e.g., to obtain product information. That information is sent to the model mapper 412 to transform the data from the database 410 into models appropriate and usable by the client application. Thus, the data service 404 does not need to populate the data models itself. Instead, this task is delegated to the dedicated model mappers 412.

Figure 5:
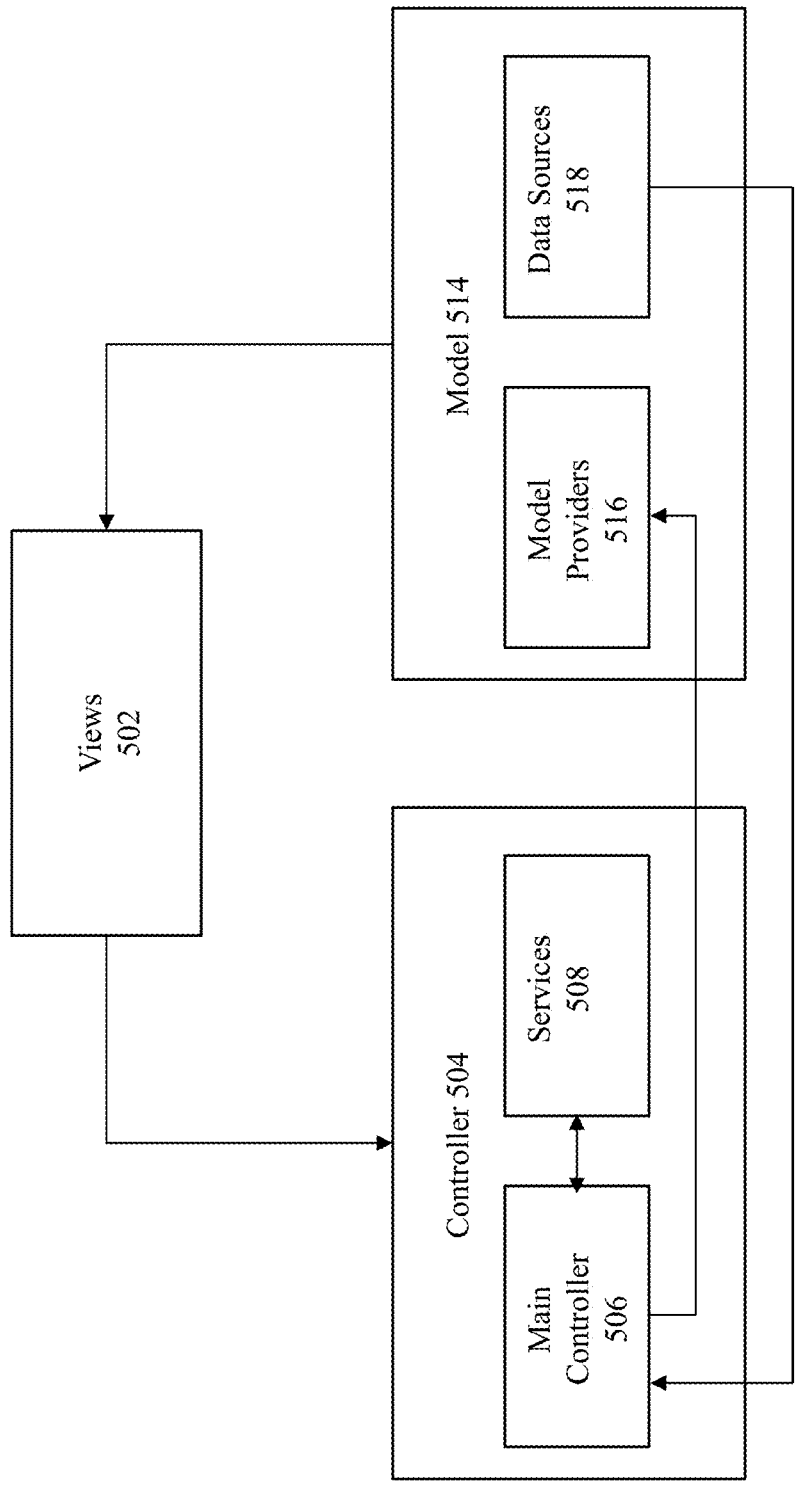
FIG. 5 illustrates an approach for implementing the client-side components according to some embodiments of the invention.

FIG. 5 illustrates an approach for implementing the client-side components according to some embodiments of the invention. In some embodiments, the client side is a JavaScript application executed in a web browser. Preferably, the client-side application uses very few third-party JavaScript libraries, except for common ones such as jQuery and Bootstrap. The client application can be implemented as a single-page RIA (Rich Internet Application). This means that after the static content is loaded, JavaScript is used to create and modify the application document object model (DOM).

The application views 502 include the main page, library panel, studio area, frames, and various windows. The UI components are constructed dynamically by JavaScript, and typically, a component has several UI controls, e.g., buttons, text fields, and list viewers. When the main page is opened in a browser, the browser loads the main page HTML, CSS, and images. JavaScript asynchronously loads different view fragments (static HTML) that it uses later to construct a particular UI component.

The data for the views 502 is supplied by the model(s) 514 for the products represented in the diagram. The model 514 comprises model providers 516, which includes a local event bus and a data model. Any view can subscribe to events on the event bus for the model provider 516. The data sources 518 are used to provide data for products that may need some configuration or change on a regular basis. For example, if a font change needs to be performed on product names on a regular basis, then a data source 518 can be configured to provide this type of data for the model 514.

Each UI component and control is backed by its controller 504. A main controller 506 subscribes to events on a local event bus for a model. The DOM is to be updated depending upon the activities of the user in manipulating the interface. Each view and object in the views is controlled by JavaScript backed by the controller 506. When an event is detected, the task to be performed as a result of the event is handled by the main controller 506. Services 508 (e.g., library and/or product services) are used to obtain data and to parse the data to the main controller 506 in order to update the model 514, which is then used to update the views 502.

Data asynchronously loaded from the server are wrapped by the main controller 506 into the model providers 516. The model providers 516 are shared between the main controller and the component controllers. Thus, when a response is received from a server with data changes, the main controller modifies the item provider. This is indicated by the load request (e.g., as described in more detail below in FIG. 7). In some cases, to convert the raw data from the server into a format suitable for a particular model provider, a data source object 518 can be used.

The main advantage of using the intermediate model providers is that every model provider has a local event bus. This allows the system to use a publish-subscribe messaging pattern, whereby callbacks by the component controllers are unnecessary. A component controller can subscribe to an event, and when the main controller modifies the model provider, the model provider receives the notification and can adjust the user interface, for example, delete an item from a list or add a new one.

Figure 6:
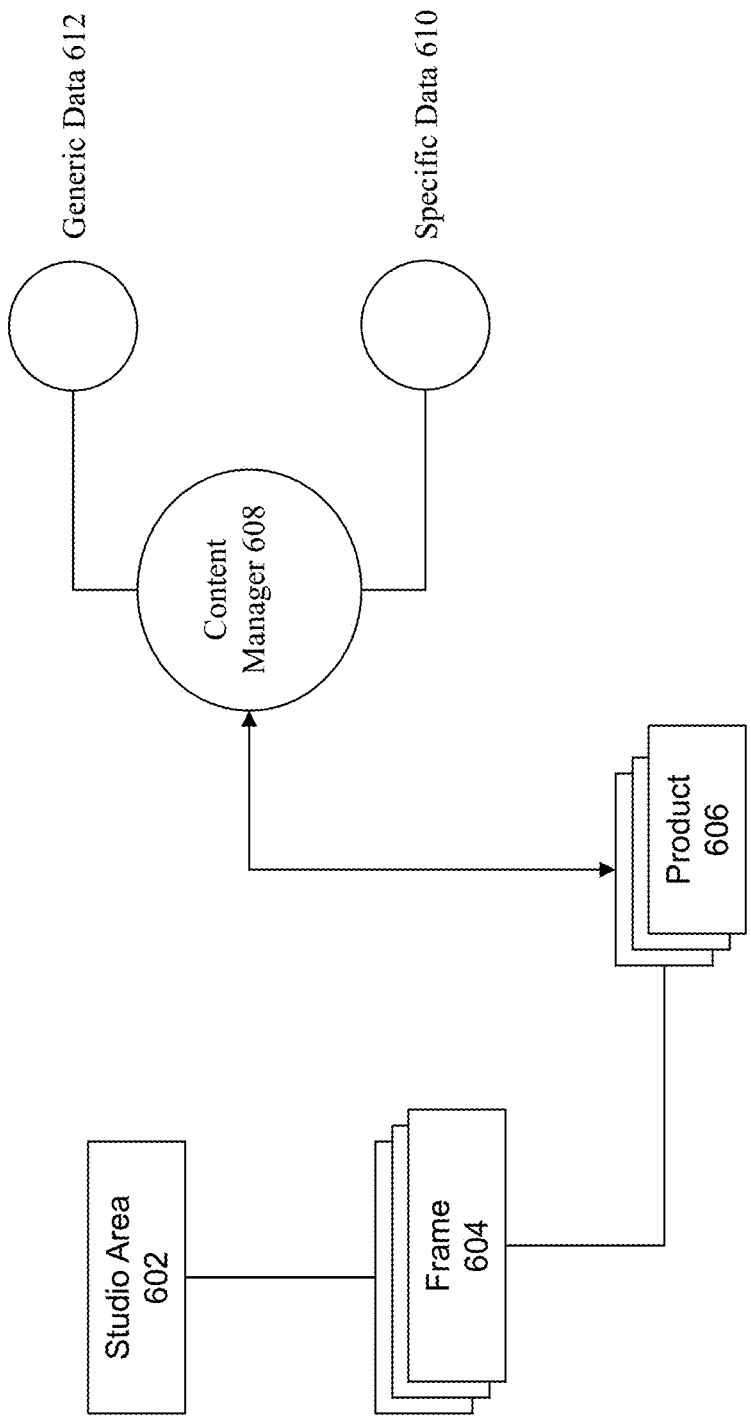
FIG. 6 illustrates data models according to some embodiments of the invention.

As illustrated in FIG. 6, some UI controls or components may use compound data models. This means that the data needed to draw a control is taken from several model providers. For example, the product component uses a Project Product (specific) data 610 and Library Product (generic) data 612. A Library Product is a prototype for project product instances. The product location on the canvas is a part of the Project Product instance, whereas the product name is common to all Project Products of the same type. A content manager 608 is employed to manage and edit this content for the products 606. This data is used for the products 606 represented in the one or more frames 604 of the studio area 602 of the user interface.

Here, a mediator pattern is used, where the content manager 608 encapsulates all used model providers and components, which it uses to modify the actual data. When an inner model provider is changed, the content manager forwards the event to the subscribed listeners because it also has a local event bus, and component controllers can use it to listen to the model changes. Similarly, when a product control wishes to change the product data, it calls appropriate methods of the content manager, which delegate to the appropriate model providers.

In FIG. 6, the "Generic Data 612" (i.e., Library Product) and "Specific Data 610" (i.e., Project Product) are logical groupings indicating the data common to all instances of a product and the data for specific instances, respectively. For example, if two instances of a product (e.g., two icons) are dragged and dropped into the studio, then there is some data that will be common to both of the instances (objects). This is the "Generic Data" in FIG. 6. Some embodiments include the following fields:
  Unique identifier (e.g., 125-bit number)
  Product name (e.g., "WebLogic")
  Icon image
  Image type (e.g., .jpeg, .png, etc.)
  Vendor identifier (e.g., integer)

Specific Data refers to a particular instance (e.g., object in Javascript) of the product. The Specific Data in some embodiments includes at least some or all of the following:
  Unique identifier (references the Generic Data field)
  Specific ID (integer) referring to that instance
  two floating point fields, representing the left and top locations in the frame, thereby indicating the icon's location
  Frame ID to indicate which frame the product (instance) belongs to. Another table can be referenced using this field to look up the frame. This Frames table can be implemented to have a field called "Project ID" that references another table to look up the Project. Thus, the Frame ID can be used to determine which Frame and Project the product instance belongs to.
  Cluster ID (references other tables, similar to Frame ID)
  Tags, e.g., including additional information that can be associated with products, such as the number of users, CPU usage, etc. This information can also be used in simulations.

Figure 7:
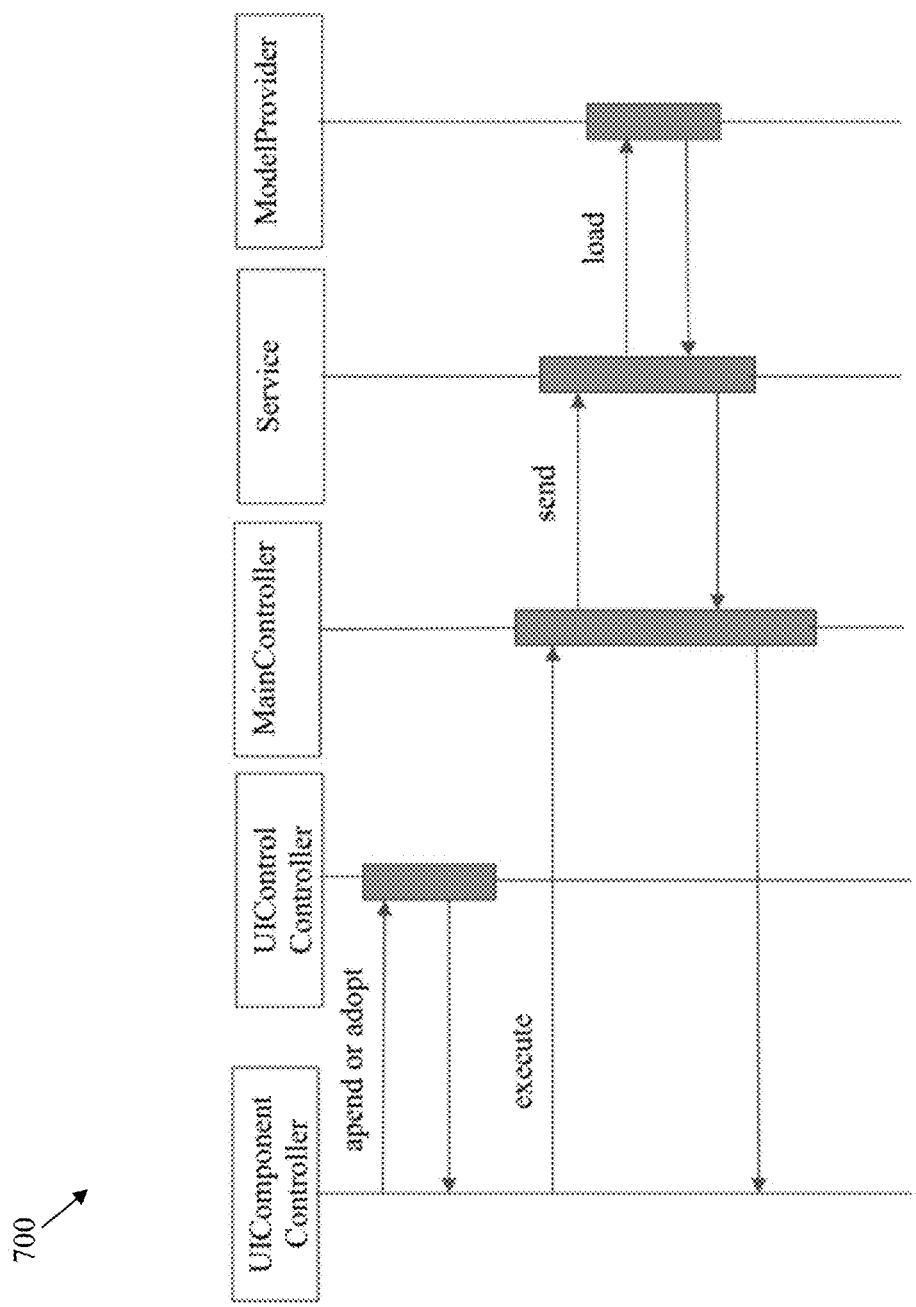
FIG. 7 shows a process flow for the lifecycle of a component per an MVC (model-view-controller) architecture.

FIG. 7 shows a process flow 700 for the lifecycle of a component per a MVC (model-view-controller) architecture. As previously mentioned, a component comprises several controls; e.g., a window has list viewers, text boxes, and buttons. A component may be created as the result of a user interaction, for example, when the user clicks on a menu item to open a window. There are two variants regarding how a component can be used. Firstly, a component controller may adopt an existing layout; in this case, when the UI object is created, the caller calls the "adopt" method. If the component layout is not yet created, then it should be created by the controller; in this case, the caller calls the "append" method of the new object. The component layout will be created and inserted in the appropriate location of the existing DOM. This can be done by creating a copy of a fragment loaded previously and initializing the copy or by creating the DOM fragment directly.

After that, the user can work with the component and its contained controls. The user interaction with the component may cause the application to send asynchronous requests to the server side. In FIG. 7, this is indicated by the "execute" request, although this can be any method call, such as "createLibrary" or "openProject". The execute request is performed by the main controller, which is responsible for selecting and using the appropriate service object. This is indicated by the "send" request in FIG. 7. When a response comes from the server, the service object calls a callback method passed by the main controller, which in turn calls a callback method passed to it by a component controller.

As noted above, simulations can be performed in some embodiments of the invention. Simulations are available for dynamic frames in certain embodiments. When a user right-clicks on a product item, a menu appears, and the available simulations can be selected. Some example simulations include basic clustering, load balancing, and ETL simulations. Architecturally, simulations are performed by simulator modules, each of which encapsulates the functionality to perform the simulation for one or more product components to be placed into a diagram. A simulation manager is provided to manage the process of operating the simulators to perform the simulation.

The simulators may operate upon simulation data in the form of a sample of an actual workload or by configuring mock operating data. For example, to simulate a workload upon a possible IT configuration (e.g., to check whether load balancing is sufficient for a given clustered database configuration), a set of load data for a given time period can be provided and applied to the components in the configured system. The underlying metadata for each component includes the requisite data to allow the simulator to accurately forecast/model the operations of the product component using the load data. In the case of verifying adequate load balancing, the load data is applied across multiple such components at their configured specifications (for example, software parameters (e.g., DB type, version, options) and hardware parameters (e.g., number of processors, memory, etc.), and the simulation estimates whether the configuration is adequate for the expected workload.

Figure 8:
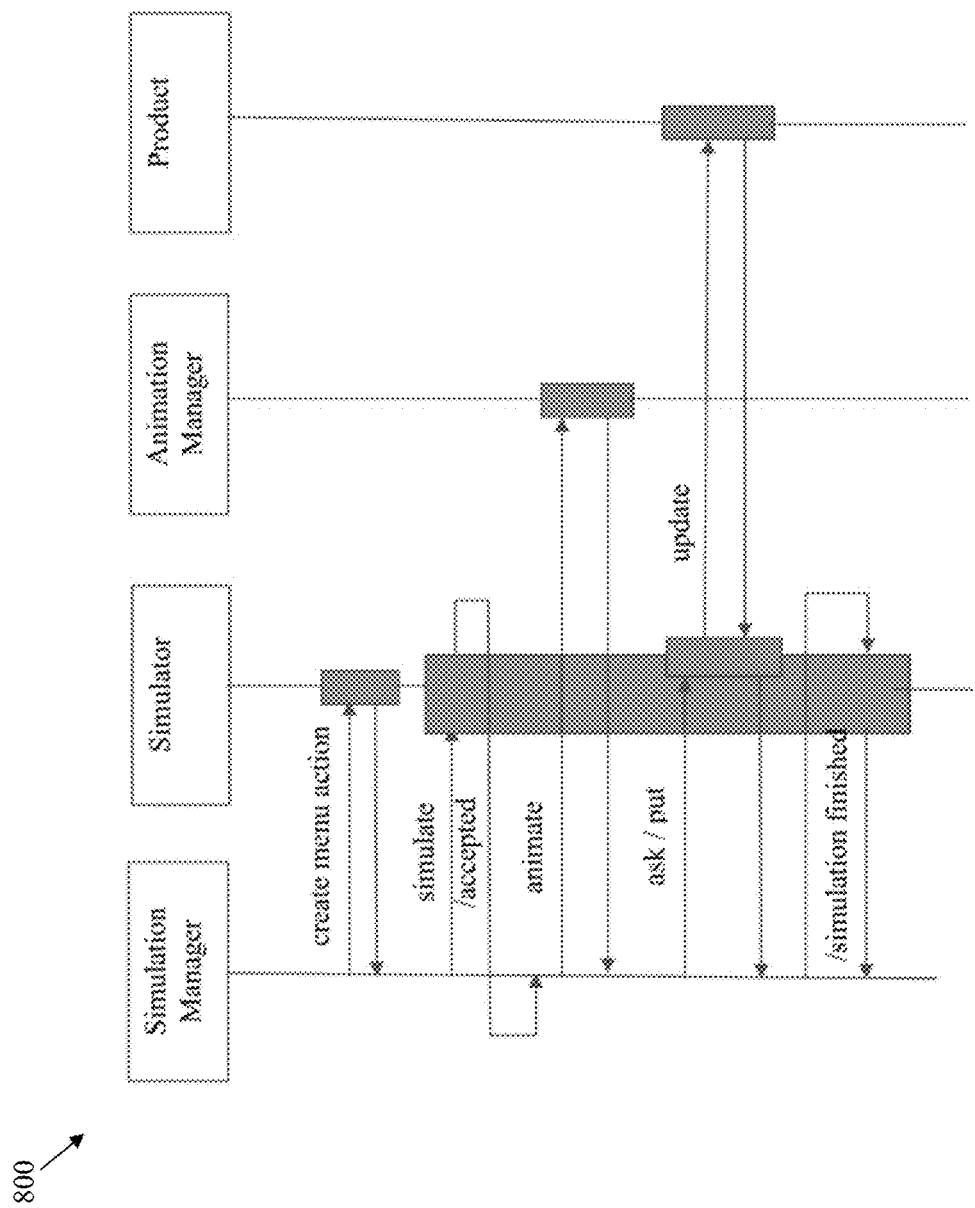
FIG. 8 illustrates an approach to implement simulation according to some embodiments of the invention.

As shown in the process flow of FIG. 8, the simulation manager checks all of the registered simulators and collects the menu items provided by them. When the corresponding menu action is called by the user, the "simulate" request is sent to the appropriate simulator, which created the menu action. The simulate method is responsible for starting the simulation.

For example, when performing an ETL (extract-transform-load) simulation, the simulator finds a product connected to the selected one and sends the "ask" request. The ask request is not sent directly; rather, the simulation manager is used as a mediator. A response from the simulator to the simulation manager contains the information about the necessary action. The simulation manager also starts the animation appropriate for the current step of the simulation. When it finishes, the simulation manager finds a simulator that can handle the "ask" or "put" request.

It is possible that the request is handled by the same simulator. This can be implemented as a second step of the simulation, which may cause the calling of another ask or put request, and the process continues in such a manner. This way, different simulators can enrich the simulation. For example, in the case of the ETL simulation, the second step can be handled by the ETL simulator, which sends the put request, but the third step may be handled by the cluster simulator, which puts the data to a selected primary node. This is where the "update" request is sent to the product. Different simulators can call different methods of the product controller. As mentioned previously, the product controller calls the content manager, which calls the model provider, and later, the main controller uses the model provider to send the data to the server.

Therefore, what has been described is an improved approach to implement system diagrams. Instead of a diagram that only contains dumb icons, the embodiments of the invention provide for diagrams having intelligent icons, which correspond to objects that have metadata about the actual product being represented by the intelligent icon.

From a sales viewpoint, the inventive concepts disclosed herein address the key issues that sales organizations face. For example, the invention will shorten the sales cycle by allowing sales representatives (i.e., account managers) to discover compliance issues, identify up-sells and cross-sells, and position products more quickly. Also, one can quickly check product compatibility and simulate business use cases using pre-existing case studies. In addition, the present approach can be used to standardize the sales and sales consulting technique. By integration with CRM and licensing and install reports, the invention provides a one-stop tool for checking the compatibility, certification, and compliance of customers' systems. The invention can also serve to improve sales efficiency by streamlining sales activities, as representatives are no longer dependent on each other for basic queries. By accessing each other's diagrams, they can search for particular architectures and research customer trends and scenarios. Past projects provide valuable sales information, e.g., regarding where the vendor tends to win or lose and why, which can be sorted, filtered, and searched multifariously owing to the metadata.

The invention is also of immense value from a sales consulting viewpoint. The invention provides a strategic inside sales weapon providing the ability to quickly demonstrate the improvements offered by proposed architectures using a unique modeling, simulation, and demonstration software. Concerning customer engagement, the invention allows sales consultants to propose and validate ad-hoc architectures and deliver high-level "simulation-of-concept" demonstrations for customers over web-based meetings. Using the invention, sales consultants can quickly validate and demonstrate the functionality of architectures that are proposed by sales representatives. Customers can potentially use it as well, e.g., to view demonstrations and share projects with sales consultants.

Furthermore, the invention can be used as a training tool for both new and tenured consultants, allowing a simple drag-drop-simulate approach to learn abstract enterprise IT concepts (e.g., caching, clustering, disaster recovery). One can build an architecture from scratch, explore and tweak pre-built case studies and events, or search for up-sells for specific sales campaigns. Moreover, one can explore product capabilities and interrelations without suffering long, laborious installations and bug fixing in implementation. Consultant managers can assign projects wherein sales consultants design and demonstrate specific business use cases, i.e., prepare case studies, perhaps based on observations regarding customer trends. The invention can also be used by consultants to design the flow and/or environment of actual product demonstrations, e.g., to provide specifications for existing or desired demo images (i.e., virtual machines).

Any IT concept can be implemented, verified, visualized, and/or simulated using embodiments of the invention. Described above are illustrated examples pertaining to clustering, load balancing, and ETL concepts. However, it is noted that the invention is not limited to these, and numerous others are also usable in conjunction with the disclosed embodiments, including (a) caching; (b) throttling; (c) disaster recovery; (d) query offloading; (e) mobile access; (f) SOA (service oriented architecture); (g) enterprise service bus; (h) auditing; (i) security; (j) SLAs (service level agreements); (k) management/monitoring; (l) forms and reports (e.g., on client applications); (m) virtualization; (n) partitioning; (o) multi-tenancy; and/or (p) big data.

System Architecture Overview

Figure 9:
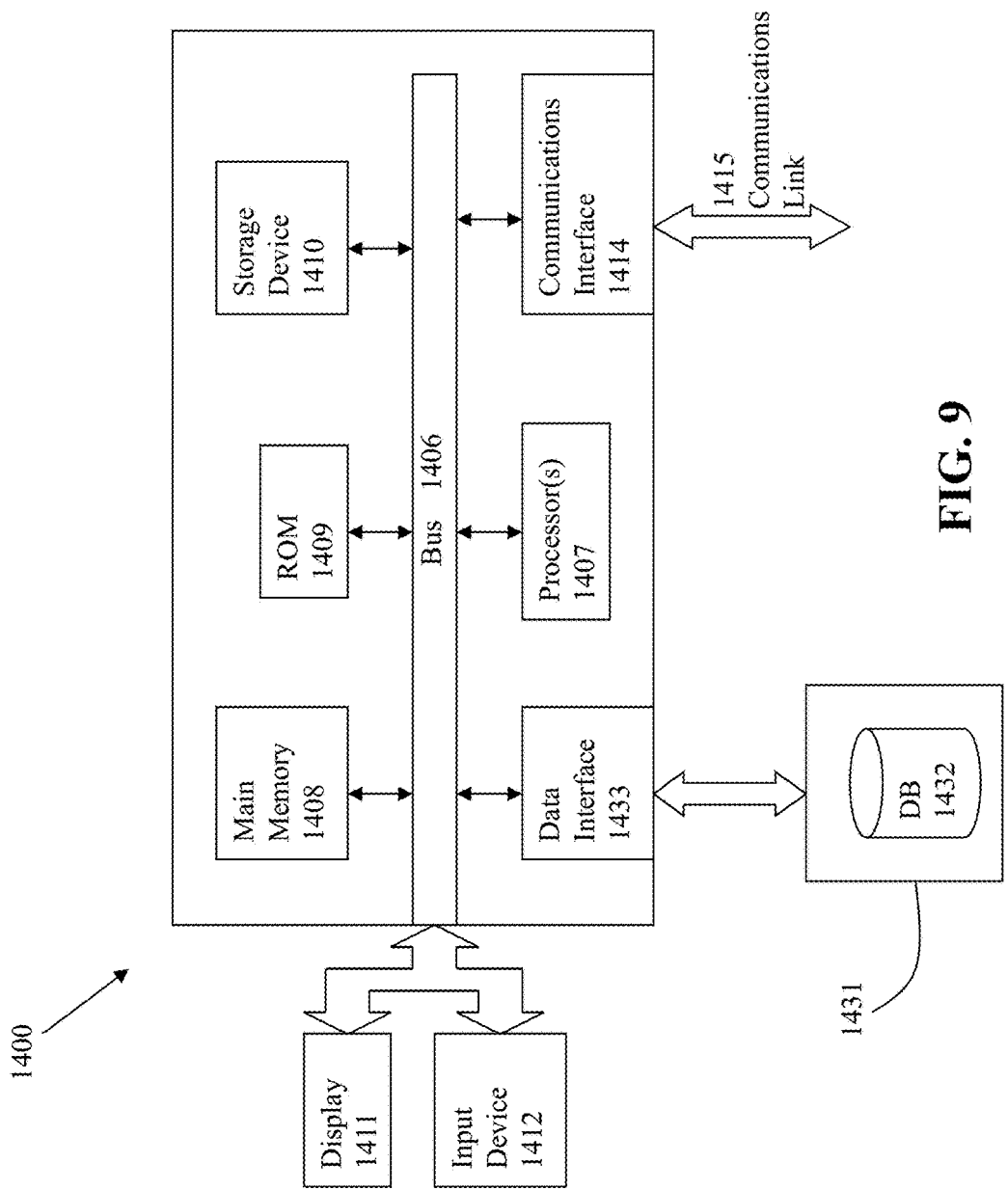
FIG. 9 shows the architecture of an example computing system with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to non-volatile media and volatile media. Non-volatile media includes, for example, optical or magnetic disks, such as disk drive 1410. Volatile media includes dynamic memory, such as system memory 1408.

Common forms of computer readable media includes, for example, a floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, the execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application, code through communication link 1415 and communication interface 1414. Received program code may be executed by processor 1407 as it is received and/or stored in disk drive 1410 or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification do not necessarily refer to the same embodiment or embodiments.

What is claimed is:

1. A method comprising:
   maintaining a simulation architecture comprising:
      a simulation manager, and
      one or more simulators, wherein each simulator of the one or more simulators encapsulates a functionality to perform simulation for one or more products corresponding to respective icons inserted onto a diagram, the simulation manager selecting a simulator from the one or more simulators to perform a respective simulation;
   receiving instructions to insert an icon of a product into a diagram on a computer-based user interface;
   identifying, from a library comprising software products and hardware products represented as product objects, a product object, wherein the product object corresponds to the product;
   creating an instance of the product object by inserting the icon of the product into the diagram on the computer-based user interface, wherein the instance of the product object is configured with product-related information for the product;
   determining metadata for the instance of the product object, wherein the metadata comprises the product-related information, methods and variables associated with the instance corresponding to real-world properties of the product corresponding to the icon inserted in the diagram;
   receiving, via an action performed on the icon of the product, a user selection of an available simulation;
   selecting, by the simulation manager, a particular simulator based on the user selection and the product; and
   performing, using the particular simulator, a simulation on the instance of the product object using the methods and variables associated with the instance.

2. The method of claim 1, wherein the diagram on the computer-based user interface is configured as a dynamic frame to perform the simulation, wherein the dynamic frame comprises listeners to perform the simulation using simulation data.

3. The method of claim 1, wherein the simulation is performed by configuring sample data from a set of load data for a time period to simulate a workload.

4. The method of claim 1, wherein both client-side components and server-side components are employed, the client-side components corresponding to an application running in a web browser and the server-side components operating at a server to access a database.

5. The method of claim 4, wherein the client-side components are implemented as a model-view-controller architecture comprising:
   a view,
   a controller, and
   a model, wherein data for the view is supplied by the model for the product represented as the icon inserted in the diagram.

6. The method of claim 5, wherein the controller handles events in the view, the model is updated as a result of user interaction with interface elements in the view, and updates to the model result in updates that are visually represented in the view.

7. The method of claim 5, wherein the server-side components are executed in a container at the server to execute queries against the database, and to create model data to be sent to the client.

8. The method of claim 5, wherein the view and one or more product objects within the view are controlled by JavaScript backed by the controller, wherein when an event is detected, a task to be performed as a result of the event is handled by the controller.

9. The method of claim 5, wherein the model comprises one or more model providers and one or more data sources, wherein each model provider of the one or more model providers comprises a local event bus and a data model, the one or more data sources providing data for products.

10. The method of claim 9, wherein the view subscribes to one or more events on the local event bus.

11. The method of claim 5, wherein the server-side components comprise a model mapper to generate the data model from data from the database, the data model to be sent to the client-side components.

12. The method of claim 1, wherein the simulation performs at least one of clustering, load balancing, ETL simulation, caching, throttling, disaster recovery, query offloading, mobile access, SOA (service oriented architecture), enterprise service bus, auditing, security, SLAs (service level agreements), management/monitoring, forms and reports, virtualization, partitioning, multi-tenancy, or big data.

13. A non-transitory computer readable medium having stored thereon a sequence of instructions which, when executed by a processor causes the processor to execute a process, the process comprising:
   maintaining a simulation architecture comprising:
      a simulation manager, and one or more simulators, wherein each simulator of the one or more simulators encapsulates a functionality to perform simulation for one or more products corresponding to respective icons inserted onto a diagram, the simulation manager selecting a simulator from the one or more simulators to perform a respective simulation;

receiving instructions to insert an icon of a product into a diagram on a computer-based user interface;

identifying, from a library comprising software products and hardware products represented as product objects, a product object, wherein the product object corresponds to the product;

creating an instance of the product object by inserting the icon of the product into the diagram on the computer-based user interface, wherein the instance of the product object is configured with product-related information for the product;

determining metadata for the instance of the product object, wherein the metadata comprises the product-related information, methods and variables associated with the instance corresponding to real-world properties of the product corresponding to the icon inserted in the diagram;

receiving, via an action performed on the icon of the product, a user selection of an available simulation;

selecting, by the simulation manager, a particular simulator based on the user selection and the product; and performing, using the particular simulator, a simulation on the instance of the product object using the methods and variables associated with the instance.

14. The computer readable medium of claim 13, wherein the diagram on the computer-based user interface is configured as a dynamic frame to perform the simulation, wherein the dynamic frame comprises listeners to perform the simulation using simulation data.

15. The computer readable medium of claim 13, wherein the sequence of instructions is executable to perform the simulation by configuring sample data from a set of load data for a time period to simulate a workload.

16. The computer readable medium of claim 13, wherein both client-side components and server-side components are employed, the client-side components corresponding to an application running in a web browser and the server-side components operating at a server to access a database.

17. The computer readable medium of claim 16, wherein the client-side components are implemented as a model-view-controller architecture comprising:
a view,
a controller, and
a model, wherein data for the view is supplied by the model for the product represented as the icon inserted in the diagram.

18. The computer readable medium of claim 17, wherein the controller handles events in the view, the model is updated as a result of user interaction with interface elements in the view, and updates to the model result in updates that are visually represented in the view.

19. The computer readable medium of claim 17, wherein the view and one or more product objects within the view are controlled by JavaScript backed by the controller, wherein when an event is detected, a task to be performed as a result of the event is handled by the controller.

20. The computer readable medium of claim 17, wherein the model comprises one or more model providers and one or more data sources, wherein each model provider of the one or more model providers comprises a local event bus and a data model, the one or more data sources providing data for products.

21. The computer readable medium of claim 20, wherein the view subscribes to one or more events on the local event bus.

22. The computer readable medium of claim 17, wherein the server-side components comprise a model mapper to generate the data model from data from the database, the data model to be sent to the client-side components.

23. The computer readable medium of claim 16, wherein the server-side components are executed in a container at the server to execute queries against the database, and to create model data to be sent to the client.

24. The computer readable medium of claim 13, wherein the simulation corresponds to at least one of clustering, load balancing, ETL simulation, caching, throttling, disaster recovery, query offloading, mobile access, SOA (service oriented architecture), enterprise service bus, auditing, security, SLAs (service level agreements), management/monitoring, forms and reports, virtualization, partitioning, multi-tenancy, or big data.

25. A system, comprising:
a user station having a set of client-side components, the set of client-side components comprising an interface to receive instructions to insert an icon of a product into a diagram on a computer-based user interface, wherein the icon corresponds to a product object relating to a real-world product, and an instance of the product object is created such that metadata is determined for the instance of the product object, the instance of the product object is configured with product-related information for the product, the metadata comprising the product-related information, methods and variables associated with the instance and corresponding to real-world properties of the product corresponding to the icon inserted in the diagram;
a database comprising product information, the database implemented with one or more storage devices; and
a server having a set of server-side components, the set of server-side components accessible by the client-side components to query the database for the product information, the server maintaining a simulation architecture comprising:
a simulation manager, and one or more simulators, wherein each simulator of the one or more simulators encapsulates a functionality to perform simulation for one or more products corresponding to respective icons inserted onto a respective diagram, the simulation manager selecting a simulator from the one or more simulators to perform a simulation, the server performing a simulation on the instance of the product object upon receiving a request from a user selecting an available simulation from the icon corresponding to the product from the diagram to perform the simulation, wherein the simulation manager selects a simulator associated to the product based on the request from the user and performs the simulation using the methods and variables associated with the instance.

26. The system of claim 25, wherein the client-side components are implemented as a model-view-controller architecture comprising:
a view,
a controller, and a model, wherein data for the view is supplied by the model for the product represented as the icon inserted in the diagram.

27. The system of claim 26, wherein the controller handles events in the view, the model is updated as a result of user interaction with interface elements in the view, and updates to the model result in updates that are visually represented in the view.

28. The system of claim 26, wherein the server-side components comprise a model mapper to generate the data model from data from the database, the data model to be sent to the client-side components.

29. The system of claim 26, wherein the view and one or more product objects within the view are controlled by JavaScript backed by the controller, wherein when an event is detected, a task to be performed as a result of the event is handled by the controller.

30. The system of claim 26, wherein the model comprises one or more model providers and one or more data sources, wherein each model provider of the one or more model providers comprises a local event bus and a data model, the one or more data sources providing data for products.

31. The system of claim 30, wherein the view subscribes to one or more events on the local event bus.

32. The system of claim 25, wherein the server-side components are executed in a container at the server to execute queries against the database, and to create model data to be sent to the client.

33. The system of claim 25, wherein the server-side components comprise a data service to send a query to a query executor, the query executor executing queries against the database.

34. The system of claim 33, wherein a query accessory is used to identify the query from among a set of possible queries.

35. The system of claim 25, wherein the simulation performs at least one of clustering, load balancing, ETL simulation, caching, throttling, disaster recovery, query offloading, mobile access, SOA (service oriented architecture), enterprise service bus, auditing, security, SLAs (service level agreements), management/monitoring, forms and reports, virtualization, partitioning, multi-tenancy, or big data.

36. The system of claim 25, wherein the diagram on the computer-based user interface is configured as a dynamic frame to perform the simulation, wherein the dynamic frame comprises listeners to perform the simulation using simulation data.

37. The system of claim 25, wherein the simulation is performed by configuring sample data from a set of load data for a time period to simulate a workload.

* * * * *

UNITED STATES PATENT AND TRADEMARK OFFICE
CERTIFICATE OF CORRECTION

PATENT NO. : 10,198,537 B2  
APPLICATION NO. : 14/586474  
DATED : February 5, 2019  
INVENTOR(S) : Warrier Page 1 of 1

It is certified that error appears in the above-identified patent and that said Letters Patent is hereby corrected as shown below:

In the Specification

In Column 2, Line 26, delete "product project," and insert -- product, --, therefor.

Signed and Sealed this  
Fourth Day of February, 2020

Andrei Iancu  
*Director of the United States Patent and Trademark Office*